(12) United States Patent
So

(10) Patent No.: US 7,518,522 B2
(45) Date of Patent: Apr. 14, 2009

(54) ELECTRONIC FENCE SYSTEM AND CONTROLLING METHOD THEREOF

(76) Inventor: Ho Yun So, 8-1006 Kwangjang Apt., 28, Youido-dong, Yongdungpo-gu, Seoul 150-762 (KR)

( * ) Notice: Subject to any disclaimer, the term of this patent is extended or adjusted under 35 U.S.C. 154(b) by 347 days.

(21) Appl. No.: 11/452,015

(22) Filed: Jun. 12, 2006

(65) Prior Publication Data
US 2006/0226994 A1  Oct. 12, 2006

Related U.S. Application Data

(63) Continuation-in-part of application No. 10/845,039, filed on May 12, 2004, now Pat. No. 7,081,821.

(30) Foreign Application Priority Data
Dec. 29, 2003  (KR) .................. 10-2003-0098864

(51) Int. Cl.
*G08B 23/00* (2006.01)
(52) U.S. Cl. ................. 340/573.3; 340/573.4; 119/720; 119/721
(58) Field of Classification Search .............. 340/573.3, 340/573.4; 119/720, 721
See application file for complete search history.

(56) References Cited

U.S. PATENT DOCUMENTS

| | | | |
|---|---|---|---|
| 5,121,711 A | | 6/1992 | Aine |
| 5,170,149 A | * | 12/1992 | Yarnall et al. ............. 340/573.3 |
| 5,207,178 A | * | 5/1993 | McDade et al. ............. 119/859 |
| 5,353,744 A | * | 10/1994 | Custer ......................... 119/719 |
| 5,381,129 A | | 1/1995 | Boardman |
| 5,408,956 A | | 4/1995 | Quigley |
| 5,682,839 A | | 11/1997 | Grimsley et al. |
| 5,781,113 A | | 7/1998 | Yarnall, Sr. et al. |
| 5,808,551 A | * | 9/1998 | Yarnall et al. ............. 340/573.4 |
| 5,844,489 A | | 12/1998 | Yarnall, Jr. et al. |
| 5,967,094 A | | 10/1999 | Grimsley et al. |
| 6,043,748 A | | 3/2000 | Touchton et al. |
| 6,360,698 B1 | * | 3/2002 | Stapelfeld et al. ........... 119/720 |
| 6,598,563 B2 | * | 7/2003 | Kim et al. .................... 119/720 |

(Continued)

*Primary Examiner*—Daniel Wu
*Assistant Examiner*—Edny Labbees
(74) *Attorney, Agent, or Firm*—Holme Roberts & Owen LLP

(57) ABSTRACT

An electronic fence system comprises a fence wire which radiates a radio signal for defining a boundary; a transmitter electrically connected to the fence wire and transmitting a boundary radio signal including a mode selection signal; and a receiver attached to the pet, which receives the boundary defining signal with respect to a pet's approach to the fence wire, and which, depending on receiving the shock mode, applies an electrical shock only to the pet depending on receiving the shock mode, or depending on the shock after vibration mode which indicates a mode giving a shock after vibration, after vibration or vibration with a sound, applies an electrical shock to the pet if the boundary defining signal is continuously received or does not apply an electrical shock to the pet if the boundary defining signal is not received. If the pet has a hearing loss, or the circumference is noisy, a warning signal can be given through a touch to the skin of the pet. Since a vibration is applied first, and the shock follows it, no severe shock need be applied to the pet that will return into the confined area after having received a vibration. A pet's activity is restricted in a predetermined area.

6 Claims, 13 Drawing Sheets

U.S. PATENT DOCUMENTS

| | | | |
|---|---|---|---|
| 6,838,991 B2 * | 1/2005 | Frankewich, Jr. | 340/573.1 |
| 6,923,146 B2 * | 8/2005 | Kobitz et al. | 119/721 |
| 6,994,421 B2 * | 2/2006 | Silverbrook | 347/42 |
| 7,017,524 B2 * | 3/2006 | Gillis et al. | 119/719 |
| 2001/0030610 A1 | 10/2001 | Rochelle et al. | |
| 2002/0073933 A1 | 6/2002 | Oakman | |

\* cited by examiner

ELECTRONIC FENCE SYSTEM AND CONTROLLING METHOD THEREOF

CROSS-REFERENCE TO RELATED APPLICATIONS

This is a continuation-in-part application of patent application Ser. No. 10/845,039, filed May 12, 2004, now U.S. Pat. No. 7,081,821, which is hereby incorporated herein in its entirety by reference.

BACKGROUND OF THE INVENTION

1. Field of the Invention

The present invention relates to an electronic fence system and controlling method and, more specifically, to a system and method in which a pet's activity in a predetermined area is restricted when the pet approaches to a boundary of a confined area. A boundary signal is produced from the fence wire or a radio boundary signal is sent to a receiver worn on the pet. If the receiver receives the signal, after it gives a vibration (or vibration accompanied by sound) to the pet, it applies an electric shock to the pet according as whether or not the pet continues approaching to the boundary of the confined area, or it applies a shock only to the pet. Therefore, the pet cannot move out of the confined area.

2. Description of the Prior Art

Domestic animals are naturally wild. Thus, if pets are not chained up or a fence for confining pets is not established, they can run away and return to the wild or wander about out of the owner's control.

Most people reserve space (e.g., yard etc.) in which their pet can run freely, and the space is enclosed with a fence including braces and nets. Pets are let loose in the space to run freely.

There are problems, however, in that a fence requires an installation cost, and the fence creates an ill appearance. Further, the fence can be spoiled owing to external forces like wind or rain, and a gap through which pets can pass may be formed. The fence then, requires constant management and maintenance, as well as management personnel and its accompanying cost.

To address these problems, an electric shock method was devised. In the method, a wire is installed within the area and a signal is emitted from the wire. A receiver attached to the pet generates a shock to the pet when it approaches the wire within a certain range. The pet is confined within a boundary in which it can be controlled.

One example of the method in which a wire is installed for sending a signal is disclosed in U.S. Pat. No. 5,967,094. FIG. 1 illustrates the pet confinement system using a wire in accordance with the prior art.

A front yard or garden of a house H has a confined area 2 in which a pet may move about freely. A loop of wire represented by a dashed line is buried in the yard along the boundary of the confined area 2.

The wire 3 is electrically connected to a transmitter 4a placed inside a garage G attached to a house H. The transmitter 4a generates RF boundary signals which are radiated through a buried wire 3. As a pet approaches the wire within a predetermined range, a receiver 5a attached on the pet 1 detects the boundary signal radiated from the wire 3.

When the receiver 5a receives the boundary signal radiated from the wire 3, a shock is applied to pet 1 to cause the pet 1 not to escape from the confined area.

Further, the transmitter 4a has a lightning shelter circuitry provided at the wire 3, for protecting an energy shock such as lightning.

A radio method, as another method, was devised. In this method, a transmitter that radiates radio signals though an antenna is placed in the center of the pet's activity area. If a pet goes far away from the antenna, out of a predetermined range, a radio signal is no longer received and a receiver attached to the pet generates an electrical shock to the pet so that it may not escape from the designated area.

Such a radio method is disclosed in U.S. Pat. No. 5,381,129. FIG. 2 illustrates a pet confinement system by a radio method in accordance with the prior art.

The transmitter 4b is installed in a confined area for a pet 1 inside or near a house H. The transmitter 4b radiates a radio signal to restrict the pet's movement in the confined area according to the predetermined range from the installation point of the transmitter 4b.

The pet 1 wears a collar/receiver 5b that receives a radio signal emitted from the transmitter 4b. The receiver 5b contains a warning or shock system if the pet 1 wanders near the boundary of the confined area.

The confined area of the pet 1 is divided into several areas, such as a safe area 6, a warning area 7, and a shock area 8. The safe area 6 comprises an area in which the pet 1 receives no stimuli from the receiver 5b and can move freely around. The warning area 7 comprises an area in which the pet 1 moves into the area and receives a warning signal, in the nature of a sound or flashing light, from the receiver 5b. Next, the shock area 8 comprises an area in which the pet 1 moves into the area, and the receiver 5b generates a control signal which is a shock and gives a shock to the pet 1.

Therefore, the pet 1 remains within the safe area 6 but if the pet 1 moves into the warning area 7, it will be warned to move back into the safe area 6. Further, if the pet 1 moves into the shock area 8, a shock may be given to the pet 1 indicating no further moving forward.

The conventional confinement system using a fence or a radio has problems in that since the sound signal is used as the warning, the pet cannot recognize the warning if the pet has hearing loss or the pet is in a noisy circumference.

It has a further problem in that an electric shock is directly given when moving out of the safe area, thus enabling the pet to get an excessive shock.

SUMMARY OF THE INVENTION

In order to resolve these problems, the inventor suggests the inventive electronic fence system and controlling method thereof, in which, a vibration (or vibration accompanied by sound), or an electric shock is generated and given to the pet according to the pet's approaching distance to the boundary of a confined area. This method shocks the skin surface and indicates no further moving forward.

One objective of the present invention is an electronic fence system and a controlling method thereof, in which a pet that has a hearing loss or is in a noisy circumference can receive a warning signal through its skin, which indicates to the pet that it is approaching too closely to the boundary of the system.

Another objective of the present invention is to produce an electronic fence system and a controlling method thereof, in which no electric shock is directly applied to the pet as the pet approaches to the fence, but rather, depending on the distance, after a vibration, a vibration accompanying a sound, if the pet gets away from the electronic fence, an electronic shock is not given or if it continuously approaches to the electronic fence, an electric shock are given to the pet sequentially, thus keeping the pet within the confined area.

Another objective of the present invention is to produce an electronic fence system and a controlling method thereof in which coil sensors of the receiver can easily sense radio signal from a fence wire regardless of directions in which a pet approaches to the fence wire.

In order to accomplish the object of the present invention, an electronic fence system comprises: a fence wire buried in a yard along the boundary of a confined area within which a pet may move about freely, and which radiates a radio signal for defining a boundary; a transmitter electrically connected to the fence wire and transmitting a boundary radio signal for defining the boundary to the fence wire, the boundary signal including a mode selection signal for selecting a direct shock mode to the pet or a combination shock mode after first producing a sound; and a receiver attached to the pet, which receives the boundary defining signal with respect to a pet's approach to the fence wire, and which depending on receiving the shock mode, applies an electrical shock only to the pet depending on receiving the shock after vibration mode which indicates a mode giving a shock after vibration, after vibration or vibration with a sound, applies an electrical shock to the pet if the boundary defining signal is continuously received or does not apply an electrical shock to the pet if the boundary defining signal is not received.

The transmitter further includes: a power supply unit which receives alternating current power source and supplies constant voltage; a mode selector for selecting either electrical shock only, a combination of electrical shock and vibration; or electrical shock and vibration as well as sound to the pet; a disconnection display for sensing a breaking of the fence wire, generating a disconnection signal, and displaying a disconnection; a shock level selector for selecting a level of shock to the pet; a transmitter controller for controlling the above units and transmitting a boundary signal to the fence wire the boundary signal including a data comprising a level inputted from the shock level selector and a mode transmitted from the mode selector, and the transmitter controller for displaying a disconnection status according to a disconnection sensing signal transmitted from the disconnection display; and an amplifying unit for amplifying a signal transmitted to the fence wire from the transmitter controller.

The receiver further includes: a first and a second sensor unit for transforming radio signal radiated from the fence wire into binary data; a power supplier including a voltage regulator, a recharge battery, and a charger; a power switch for applying power to the power supplier while the user pushes the power switch; a low voltage display for sensing the voltage of the recharge battery and for displaying its low voltage status; a vibration generator for applying a vibration to the pet according to the command of the receiver controller; a sound signal generator for generating a sound according to the command of the receiver controller; a shock generator for giving an electrical shock to the pet according to the command of the receiver controller; a receiver controller for receiving the signal sent from the transmitter through the first and the second sensor unit, and controlling the respective units, such that, depending on receiving shock mode, applies only a shock to it, or depending on receiving shock after vibration mode included in the signal, after vibration or vibration with sound, if the signal is not continuously received, does not applies a shock to the pet, or if it is continuously received, applies a shock to it; and a power actuator for continually applying power to the power supplier according to a power hold signal received from the receiver controller.

The first sensor unit and the second sensor unit comprise a first and a second cylindrical coil sensor, a first and a second filter, a first and a second amplifier, and a first and a second waveform generator, respectively.

One of the first sensor and the second cylindrical coil sensor is upright mounted on the part side of the printed circuit board in the proximity of an edge, and the other is horizontally mounted in a lay down posture.

A method for controlling the electronic fence comprises: a transmitter that emits a radio signal through a fence wire provided along the boundary of a confined area, a radio signal including a mode selection signal and a shock level signal, a mode selection signal which chooses either shock mode only or a combination mode with vibration followed by shock depending on the mode selector chosen by the user, and a receiver attached to the body of a pet, which receives the radio signal, and depending on receiving shock mode, applies a shock only to the pet, or depending on receiving shock after vibration mode included in the signal, after vibration or vibration with sound, if the signal is not continuously received, does not apply a shock to the pet or if the signal is continuously received, applies a shock to the pet, wherein the level of shock depends on the data of shock level embedded in the radio signal.

Further, power is applied to the power supplier of the receiver when the power switch of the receiver is ONed for longer than a predetermined time.

Furthermore, a shock to the pet by the receiver is applied for an amount of time that cannot physically damage the pet.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
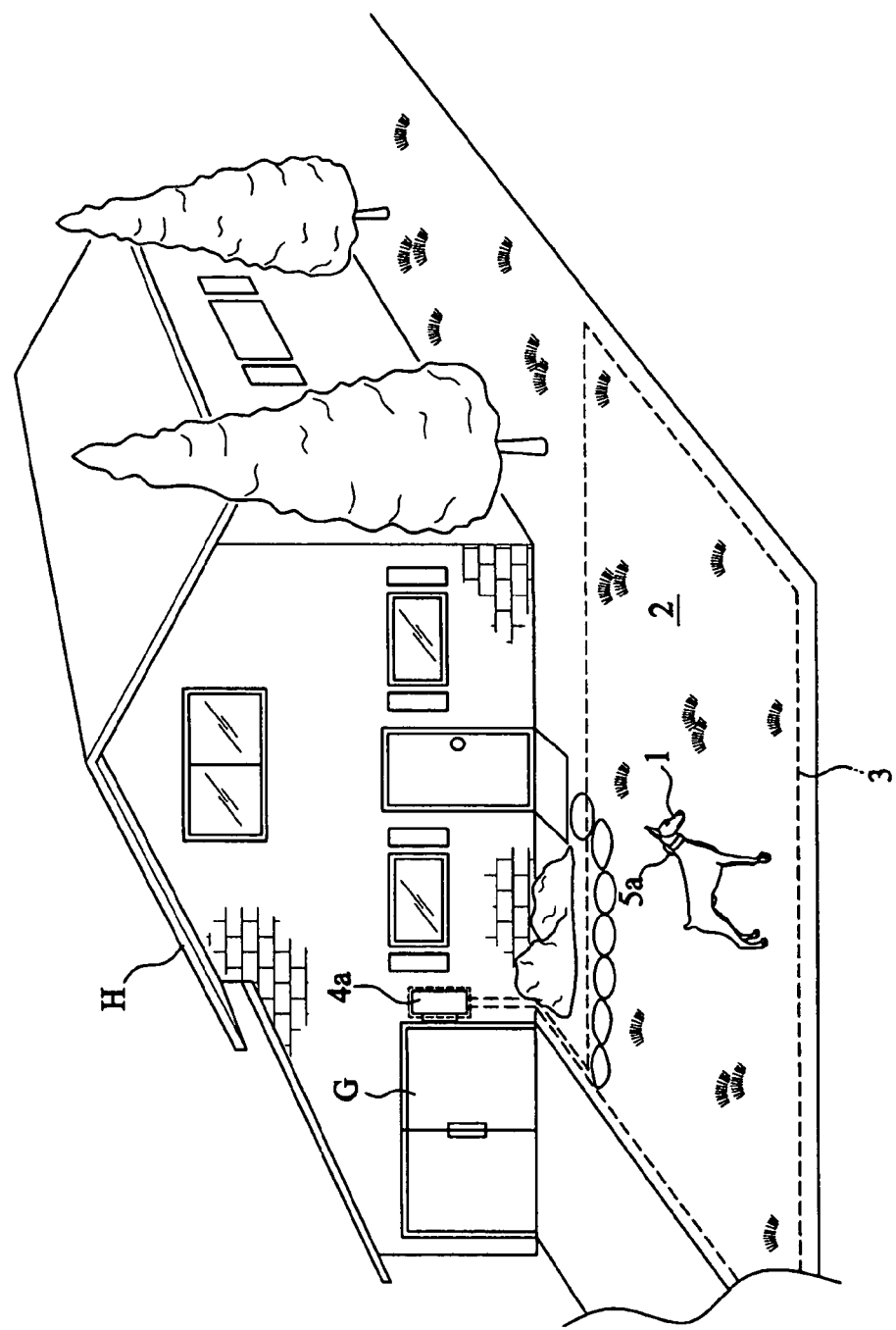
FIG. 1 is a view illustrating the pet confinement system using a wire in accordance with the prior art.
Figure 2:
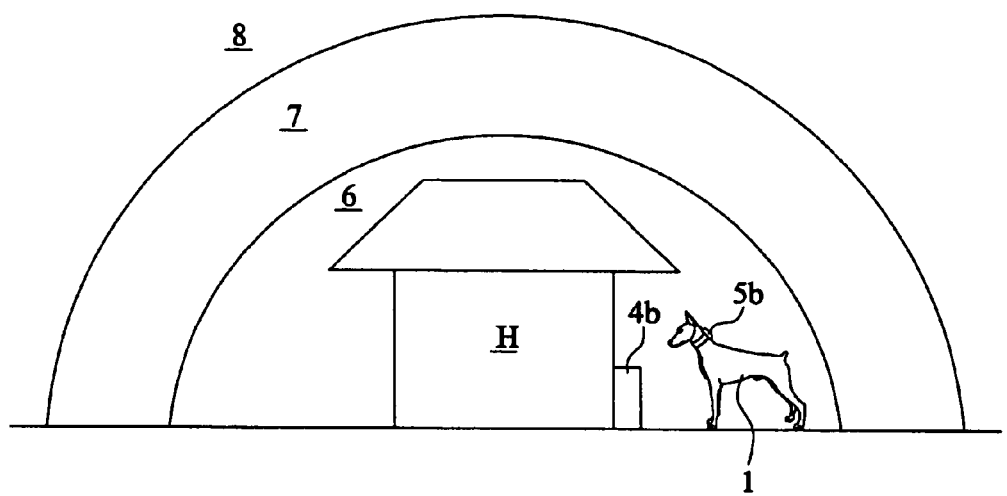
FIG. 2 is a view illustrating a pet confinement system by a radio method in accordance with the prior art.

Reference should now be made to the drawings. The same reference numerals are used throughout the different drawings to designate components that are the same or similar.

Figure 3:
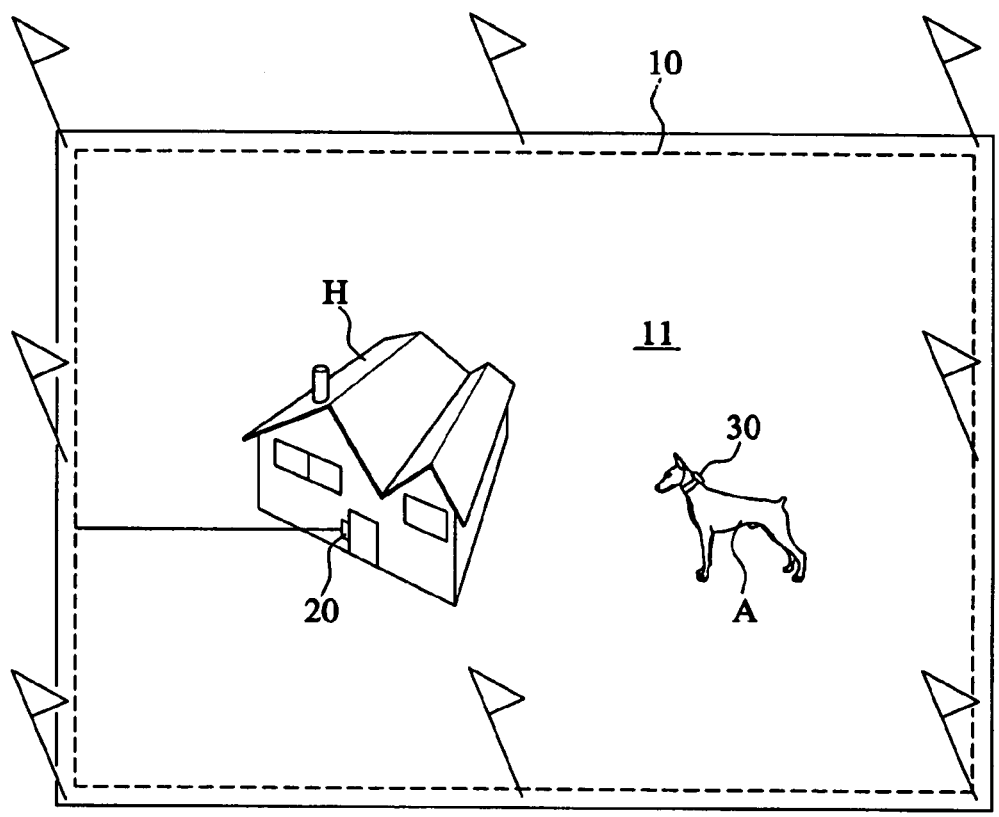
FIG. 3 is a view of an electronic system adopting a fence wire method according to the present invention.

FIG. 3 is a view of an electronic system adopting a fence wire method according to the present invention.

An electronic fence system consists of a fence wire 10, which radiates a wireless signal for defining the boundary and is buried in the yard along the boundary of a confined area 11 within which a pet A may move about freely; a transmitter 20 electrically connected to the fence wire 10 and transmitting a boundary wireless signal for defining the boundary 11 to the fence wire 10, the boundary wireless signal includes a direct shock mode to the pet or a combination shock mode after first producing a sound; and a receiver 30 attached to the pet A which receives the boundary defining signal in respect to the pet's approach to the fence wire, and, depending on receiving a shock applies only a shock to the pet, or depending on receiving a shock after vibration mode, after vibration or vibration with sound, if the signal is not continuously received, does not apply a shock to the pet or if the signal is continuously received, subsequently applies a shock to it.

The fence wire 10 is buried along the boundary of a confined area 11 in the yard or garden of a house H, and it is connected to the transmitter 20 provided inside the house H. The receiver 30 is attached to the body (e.g., the neck) of the pet with a collar.

Domestic pet A can move freely in the confined area 11, but as it approaches a predetermined area (e.g., 10 m distance from the fence wire 10 provided along the boundary of the confined area 11) the receiver 30 attached on the pet A detects radio frequency (RF) wireless signals radiated from the fence wire 10 and gives a vibration or shock to the pet.

Figure 4:
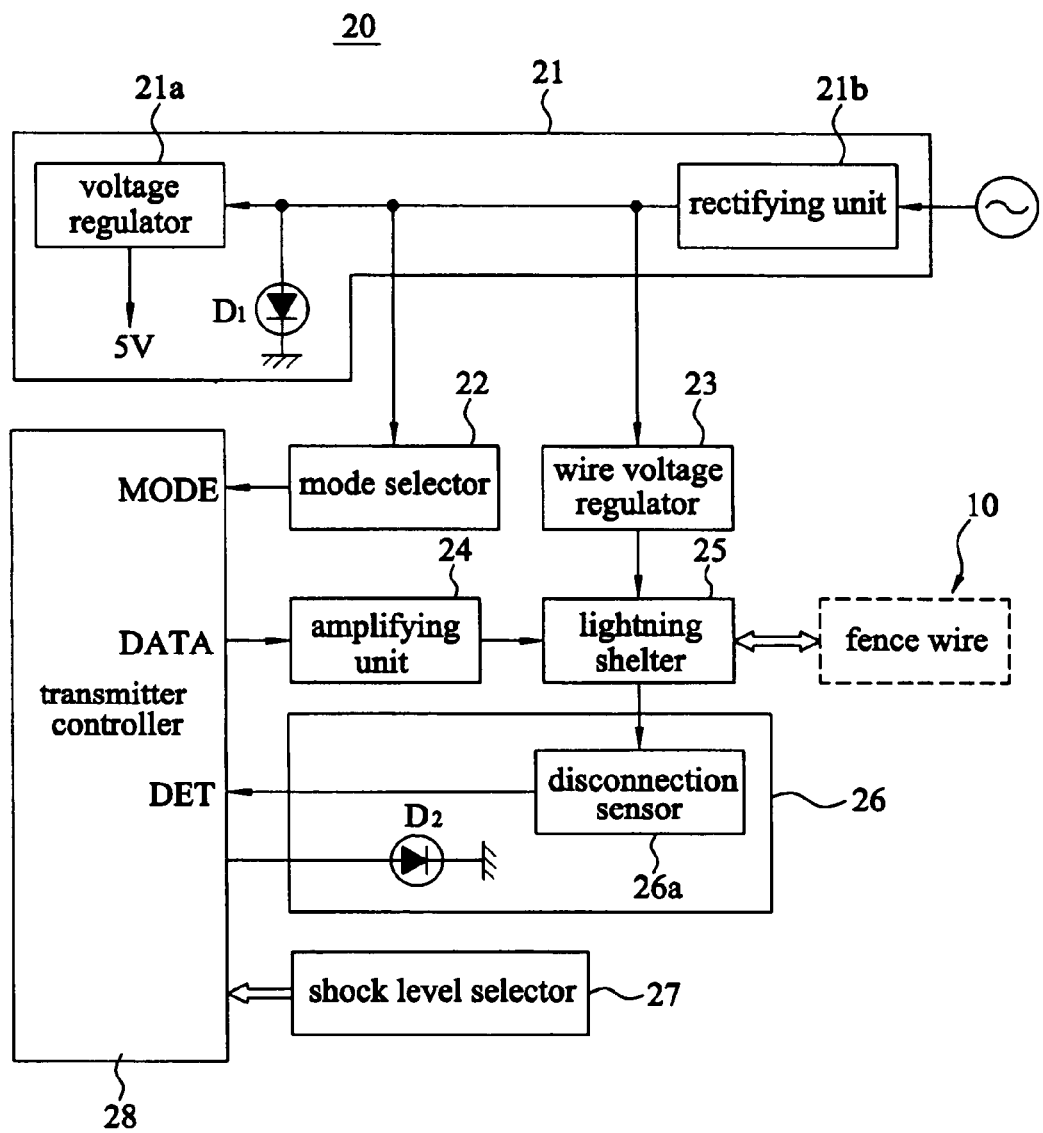
FIG. 4 is a block diagram showing the transmitter of an electronic fence system according to the present invention.

FIG. 4 is a block diagram showing the transmitter of an electronic fence system according to the present invention.

The transmitter consists of a power supplier 21 which receives an alternative current power source and supplies constant voltage; a mode selector 22 for selecting either electrical shock only; a combination of electrical shock and vibration; or a combination of electrical shock and vibration as well as sound; a disconnection display 26 for detecting a break in the fence wire 10; a shock level selector 27 for selecting a level of shock to the pet A; a transmitter controller 28 for controlling the above mentioned units and also transmitting a boundary signal to the fence wire 10, the boundary signal includes data comprising a level inputted from the shock level selector 27, and for displaying a disconnection status according to a disconnection sensing signal transmitted from the disconnection display 26; and an amplifying unit for amplifying a signal transmitted to the fence wire 10 from the transmitter controller 28.

The power supplier 21 comprises a rectifying unit 21b for converting AC supplied from an AC source into DC; a voltage regulator 21a by which the DC source transmitted from the rectifying unit 21b is outputted with constant voltage; and a light emitting diode $D_1$ for displaying the operation status of the rectifying unit 21b.

A mode selector 22 turns power off or inputs a mode selective signal in the transmitter controller 28. The mode selector 22 can select either a mode applying an electric shock only to a pet A or a mode applying an electric shock after a vibration (or vibration accompanied by sound).

As the length of the fence wire 10 is dependent on the length of the fence, a wire voltage regulator 23 regulates the voltage using a variable resistor according to the length of the fence wire. A voltage is applied to the fence wire 10 through the power supplier 21.

For instance, when the length of the fence wire 10 is 2,000 ft, DC voltage +10V is applied to the fence wire 10 from the power supplier 21 by the control of the variable resistor. In this way, the level of voltage can be controlled so that the intensity of the radio signal does not become weak even though the length of the fence wire may vary.

An amplifying unit 24 amplifies a signal applied to the fence wire 10 from the transmitter controller 28. The signal, preferably with a frequency of 10 kHz, applied to the fence wire 10 includes an identification number, a shock level signal and a mode select signal.

Figure 5:
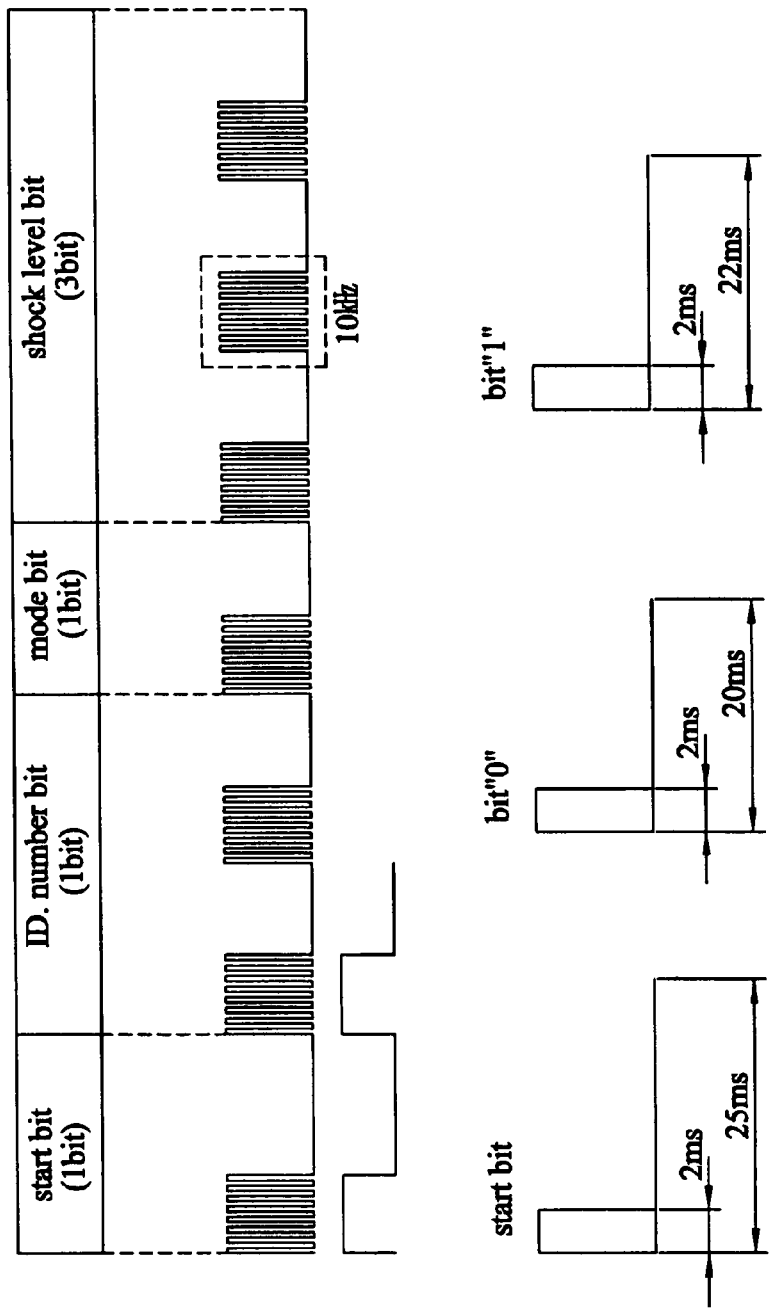
FIG. 5 is a view illustrating a format of data included in the radio signal applied to the fence wire by a transmitter.

FIG. 5 illustrates a format of data included in the radio signal applied to the fence wire by a transmitter.

The signal applied to the fence wire from the transmitter controller 28 is amplitude-modulated with a 10 kHz signal, and includes an identification number, a shock level, and mode selection data. In a format of the signal, an identification number bit, a mode level bit, and a shock level bit are radiated orderly.

A start bit generates a 10 kHz signal for 2 ms, and outputs a data signal after the lapse of 23 ms, thus showing a start bit. A data signal representing "0" generates a 10 kHz signal for 2 ms. A data signal outputs again after the lapse of 18 ms, and a data signal representing "1" generates a 10 kHz signal for 2 ms. A data signal outputs again after the lapse of 20 ms.

A form and a format of a signal may be changed, and a bit of each signal can be increased or decreased within a range which does not hinder communication.

Figure 6:
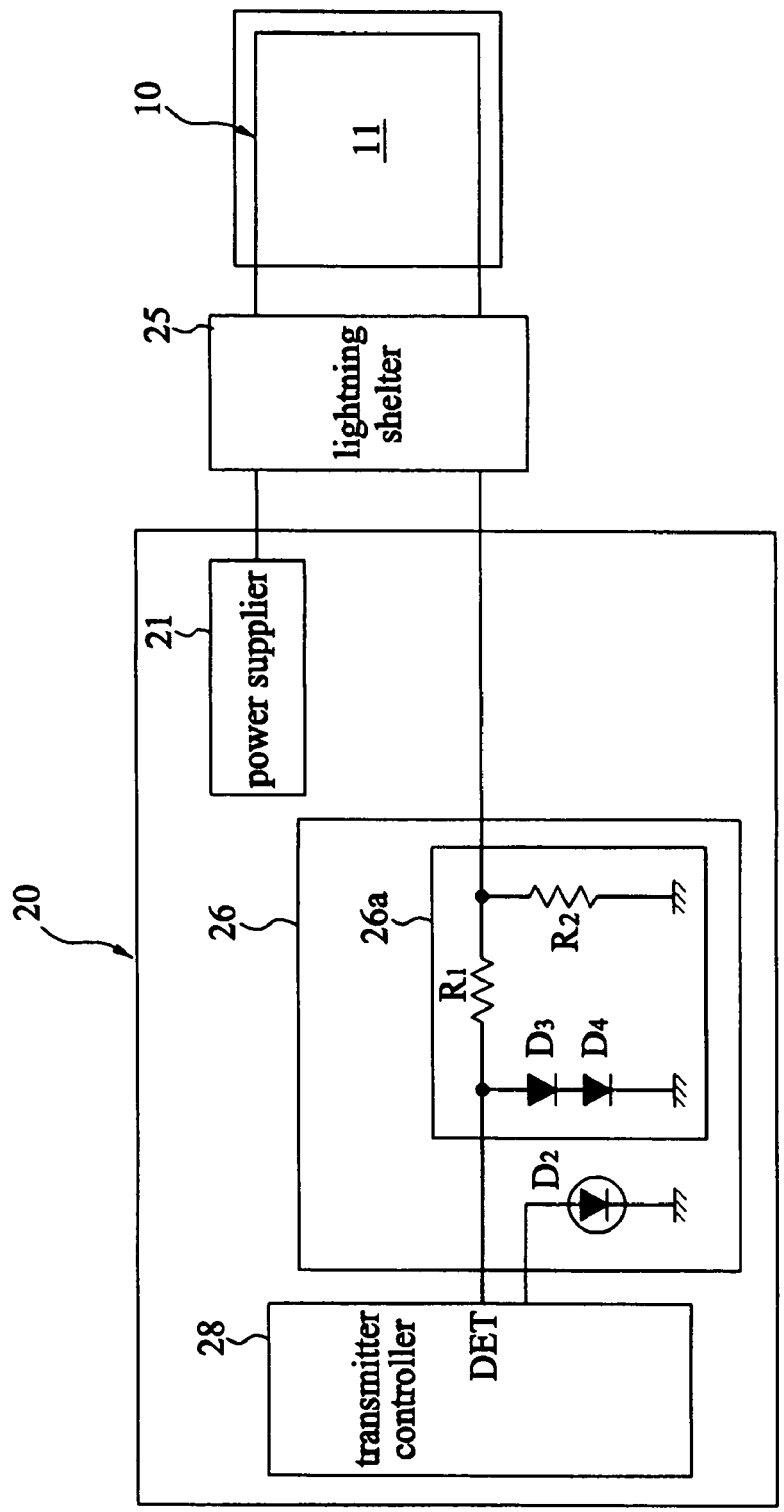
FIG. 6 is a schematic illustration of the operation of a disconnection display according to the present invention.

FIG. 6 is a schematic illustration of the operation of a disconnection display according to the present invention.

The lightning shelter 25 obstructs high voltage flowing into or through both the ac source and the fence wire 10 owing to lightning.

The disconnection display 26 comprises a disconnection sensor 26a first for sensing whether it has a disconnection or not by measuring the voltage power applied to the fence wire at one end of the fence wire and second for sending the sensing status to the transmitter controller 28. The disconnection display also includes a disconnection display emit diode $D_2$ for displaying disconnection status according to a control of the transmitter controller 28.

As shown in FIG. 6, the dc +10V is applied to one end of the fence wire 10 from the power supplier 21. The other end of the fence wire 10 is connected to the disconnection detect terminal DET of the transmitter controller 28 through the lightning shelter 25 and disconnection sensor 26a.

The disconnection sensor 26a comprises a first resistance $R_1$, connecting between an output terminal of the lighting shelter 25 and the disconnection detect terminal DET of the transmitter controller 28; a second resistance $R_2$, connecting between the disconnection detect terminal DET of the transmitter controller 28 and the ground; and diode $D_3$, $D_4$ for preventing over voltage from applying against a disconnection detect terminal DET of the transmitter controller 28.

Therefore, if the fence wire is disconnected, the voltage (e.g., DC +10V) outputted from the power supplier 21 is not detected at the disconnection detect terminal DET of the transmitter controller 28, and no source exists, which indicates a disconnection.

A signal selecting a level of shock to pet A is inputted to the transmitter controller 28 by the level selector 27. The level selector 27 may consist of a switch, by which several levels are converted to binary number data.

If either shock mode only; vibration mode followed by a shock; or vibration accompanied by a sound and followed by a shock is chosen by a mode selector 22, the source is applied and the corresponding signal (e.g., vibration mode followed by a complementary shock) is inputted to the transmitter controller 28.

The mode data representing either shock mode only, or vibration mode followed by a shock (e.g., bit indicating 1 as shown in FIG. 5) is superimposed on the radio signal to be outputted by the transmitter controller 20.

Figure 7:
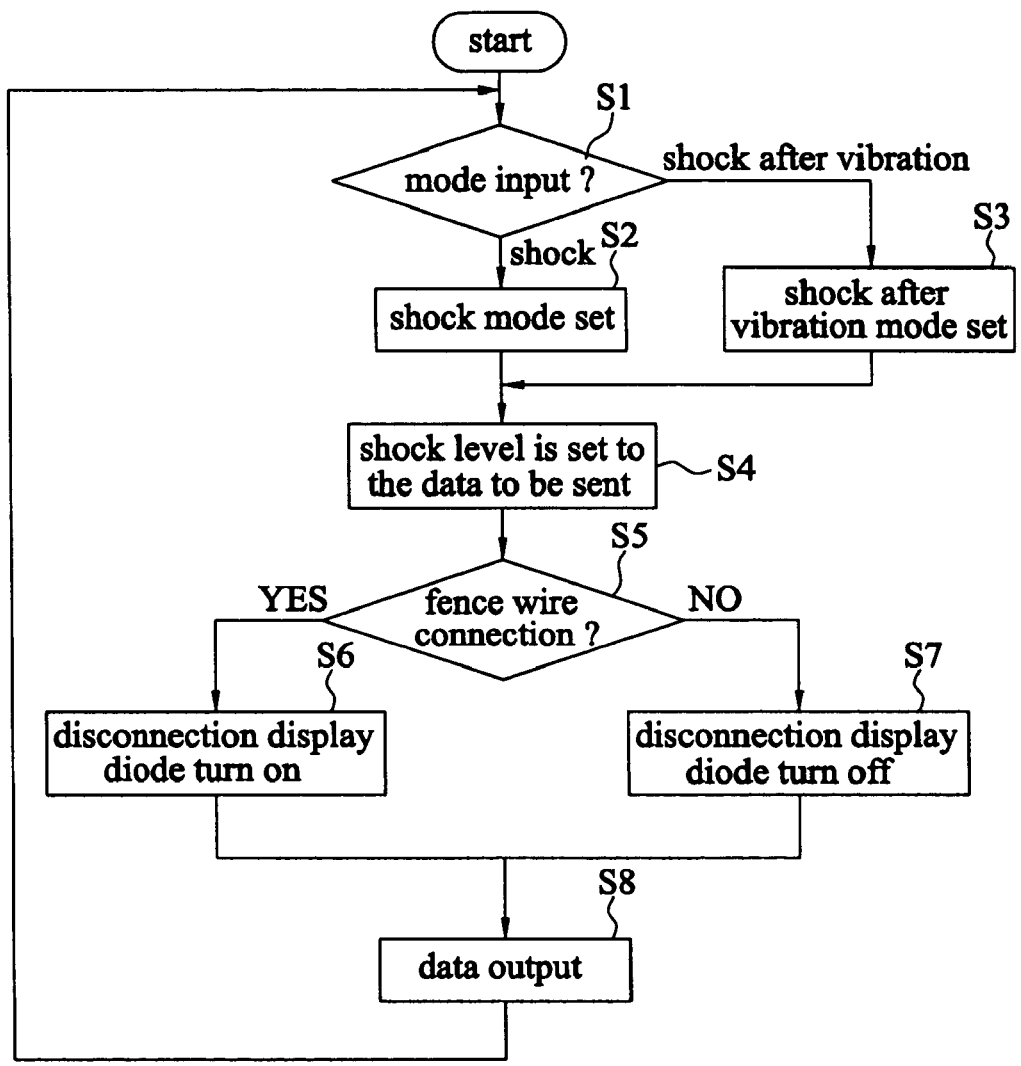
FIG. 7 is a flow chart showing a method for controlling the transmitter according to the present invention.

FIG. 7 illustrates a flow chart showing a method for controlling the transmitter according to the present invention.

The transmitter controller 28 receives a mode selection signal from the mode selector 22, and determines the mode (step S1). If the shock mode is inputted, the data to be sent to the receiver 30 is set as a shock mode (step S2). However, if a shock after vibration mode (or vibration accompanied by sound) is inputted, the data to be sent to the receiver 30 is set as a shock after the vibration mode (or vibration with sound) (step S3).

The shock level is received from the shock level selector 27, and the data to be sent to the receiver 30 is set accordingly (step S4).

After setting the shock level, it is determined whether the fence wire 10 is connected depending on the signal that is received from the disconnection sensor 26a (step S5). If the fence wire 10 has a connection, the disconnection display diode $D_2$ is turned on (step S6). If no connection exists in the fence wire 10, the disconnection display diode $D_2$ is turned off (step S7).

Subsequently, the 10 kHz signal including a set mode, a shock level and an identification number as shown in FIG. 5 is outputted to the fence wire 10 (step S8), and returns to step S1 to execute the above steps repeatedly.

Figure 8:
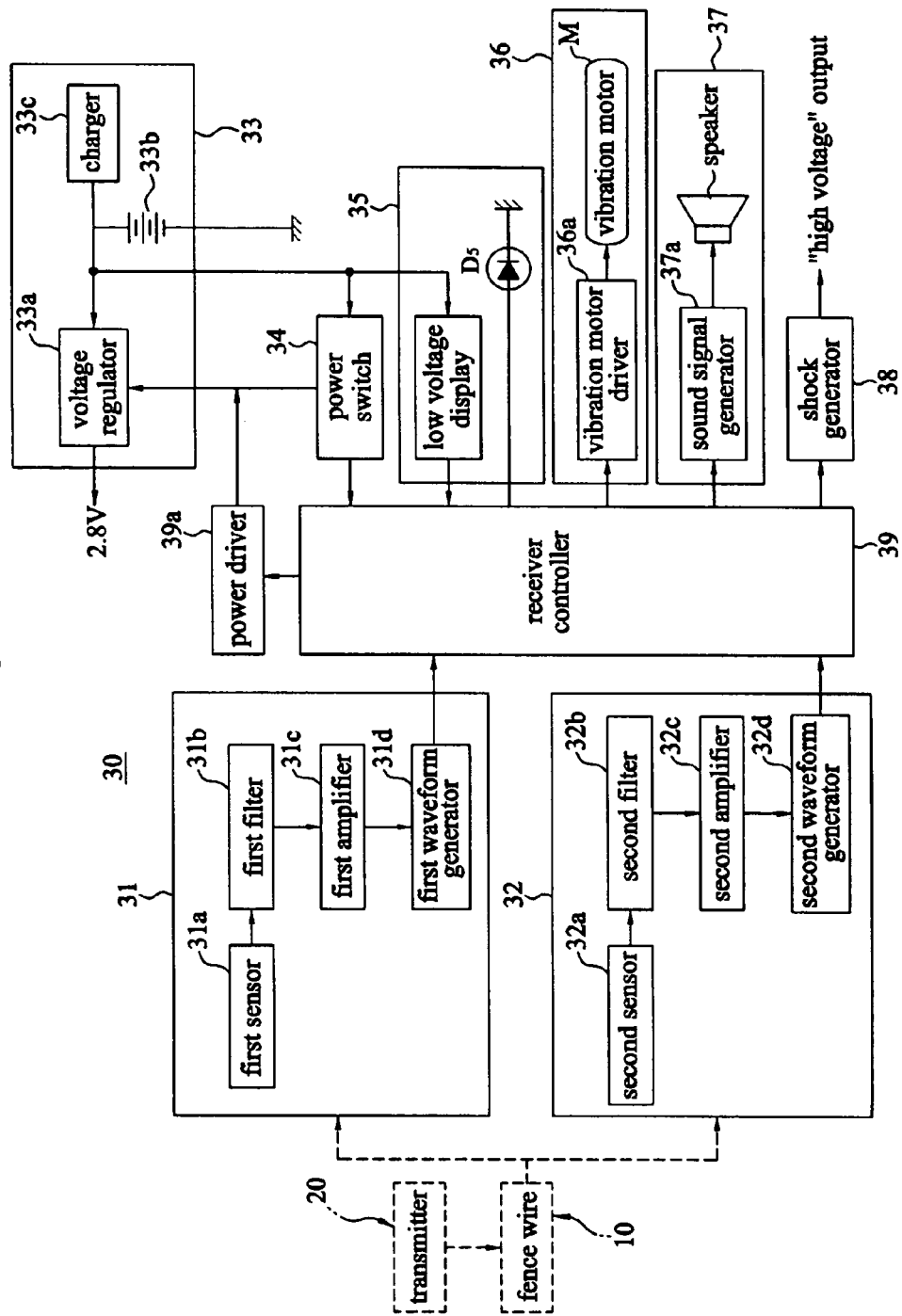
FIG. 8 is a block diagram illustrating components of a receiver according to the present invention.

FIG. 8 is a block diagram illustrating components of a receiver according to the present invention.

The receiver 30 of the electronic fence system comprises a first and a second sensor unit 31, 32 for transforming radio signal radiated from the fence wire 10 into binary digit data; a power supplier 33 including a voltage regulator 33a, a recharge battery 33b, and a charger 33c; a power switch 34 for applying power to the power supplier 33 while the user pushes the power switch 34; a low voltage display 35 for sensing the voltage of the recharge battery 33b and for displaying its low voltage status; a vibration generator 36 for applying a vibration to the pet A according to the command of the receiver controller; a sound signal generator 37 for generating a sound according to the command of the receiver controller; a shock generator 38 for giving an electrical shock to the pet A according to a control of the receiver controller; a receiver controller 39 for controlling the respective units depending on signals received from the transmitter through the first and second sensor 31, 32 and controlling the respective units, such that, depending on receiving shock mode, applies an electrical shock to the pet, or depending on receiving shock after vibration mode included in the signal, after vibration or vibration with sound, if the signal is not continuously received, does not applies an electrical shock to the pet or if it is continuously received, applies an electrical shock subsequently; and a power driver 39a for continually applying power to the power supplier 33 according to the power hold signal received from the receiver controller.

The power switch 34 is composed of a switch (e.g., tact switch) which can supply electricity to the receiver 30 while the user pushes the switch for a predetermined period. The switch can be prevented from being pushed by an exterior object when a pet A approaches an exterior object (e.g., the branches of a tree, furniture etc.).

Therefore, the receiver controller 39 applies an operation signal to the power driver 39a to apply an electric resource if the user pushes the power switch more than 0.5 second. An electric resource is continually applied to the receiver 30 by the operation signal.

Further, the power supplier 33 comprises a voltage regulator 33a, a recharge battery 33b, and a charger 33c. The voltage of the recharge battery 33b is detected by a low voltage sensor 35a, and then a low voltage signal is sent to the receiver controller 39 if the voltage of the battery is less than a predetermined voltage value. The receiver controller 39 receiving the low voltage signal turns on the low voltage display emit diode $D_5$, which indicates the low voltage status.

The first sensor unit 31 comprises a first sensor 31a, a first filter 31b, a first amplifier 31c, and a first waveform generator 31d. The first sensor 31a includes a coil, by which a radio signal radiated from the fence wire 10 can be received. Only a signal having more than a predetermined level can be sensed.

Therefore, the radio signal radiated from the fence wire 10 is sensed by the first sensor 31a in case the pet A approaches the fence wire 10 within a certain distance (e.g., 10 m).

Since the radio signal has a high frequency noise, only a 10 kHz signal can be passed through the first filter 31b. It is amplified by the first amplifier 31c, and finally an accurate pulse wave is formed by the first waveform generator.

Therefore, as shown in FIG. 5, a serial bit signal consisting of a start bit signal, an identification bit signal, a mode bit signal, and a shock level bit signal in order is outputted.

The second sensor unit 32 has the same components as the first sensor unit 31, and therefore needs no further description here.

Figure 9:
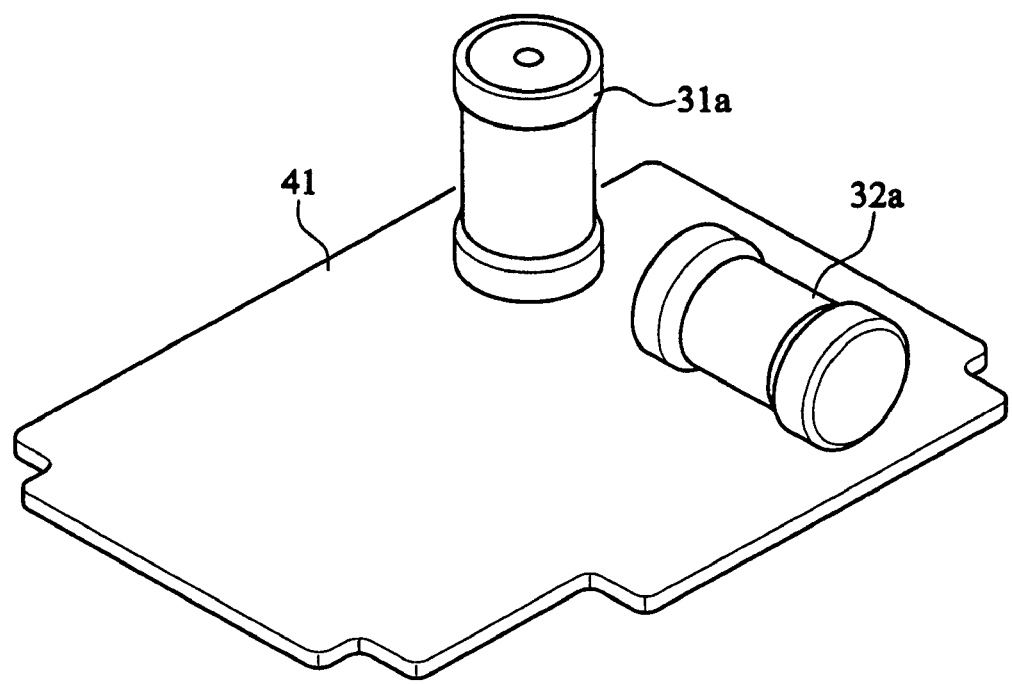
FIG. 9 is a view showing the first sensor and the second sensor mounted on the part side of the circuit board.

According to the present invention, the first and the second sensor 31a, 32a of the first and the second sensor unit 31, 32 are made of a coil sensor, and as shown in FIG. 9, they are mounted on the part side of the circuit board 41. Parts are mounted on the part side, and further their leads are soldered on a copper foil of the soldering side.

The first sensor 31a is upright mounted in the proximity of right edge of the circuit board 41, and the second sensor 32a is mounted in a put down posture.

Figure 10:
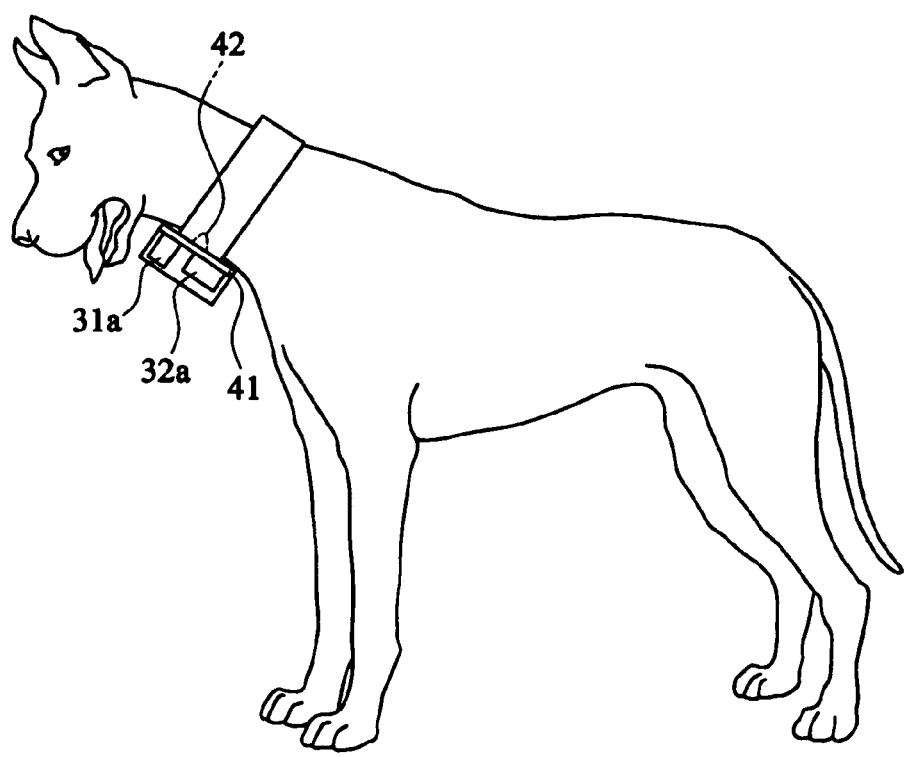
FIG. 10 is a view showing positions of the first sensor and the second sensor while a receiver is attached to the neck of a pet.

FIG. 10 shows positions of the first sensor and the second sensor while a receiver is put on the neck of a pet.

Electrical shock leads 42 of a receiver 30 are contacted to the neck of a pet, the part side of a circuit board 41 faces on the ground. The first sensor 31a which is mounted on the part side of the circuit board 41 stands uprightly toward the ground, the second sensor 32a is mounted on the part side of the circuit board 41 in the laid down posture.

Figure 11A:
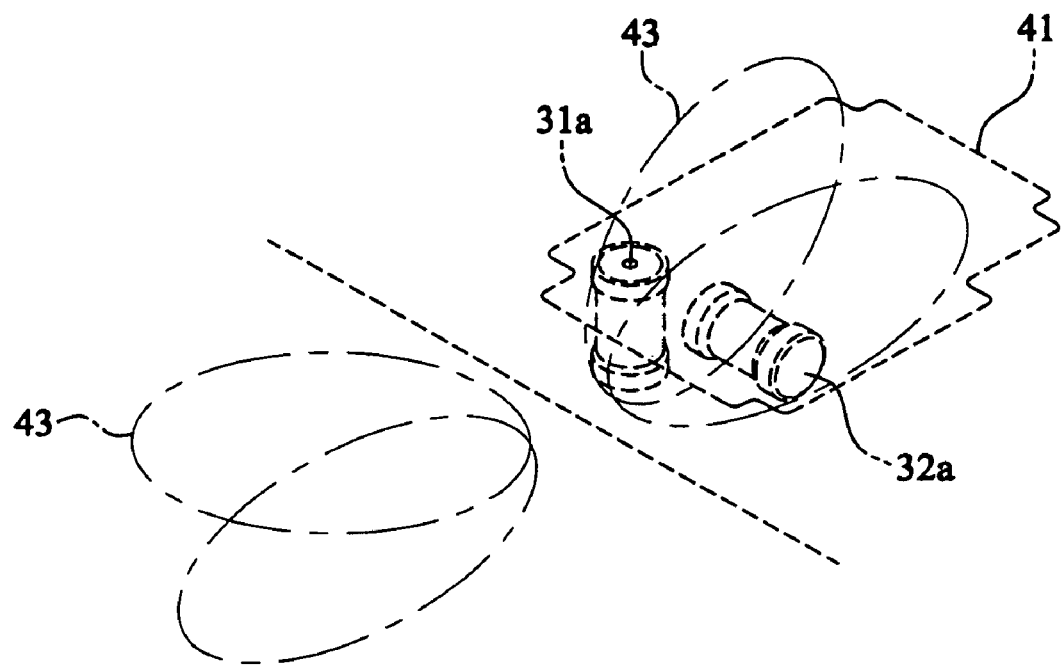
FIGS. 11A and 11B is a view showing how the first sensor and the second sensor sense electromagnetic waves radiated from the fence wire; and, FIG. 12 is a flow chart illustrating a method to control the receiver of an electronic fence system according to the present invention.

As described above, the first sensor 31a and the second sensor 32a are mounted in the receiver 30, and the pet A worn the receiver 30 may approach to the fence wire 10 in the crossing direction. FIG. 11A shows how the first sensor 31a and the second sensor 32a sense electromagnetic waves 43 radiated from the fence wire 10.

As electromagnetic waves 43 are radially radiated from the fence wire 10, as shown in FIG. 11A, when the pet A approaches to the fence wire 10 in the crossing direction, the electromagnetic waves 43 going through the bottom and the top of first sensor 31a are increased. Therefore, quantity of electromagnetic waves 43 sensed by the first sensor 31a is increased, and as the electromagnetic waves 43 go through the lateral side of the second sensor 32a, quantity of electromagnetic waves 43 sensed by the second sensor 32a is decreased.

Figure 11B:
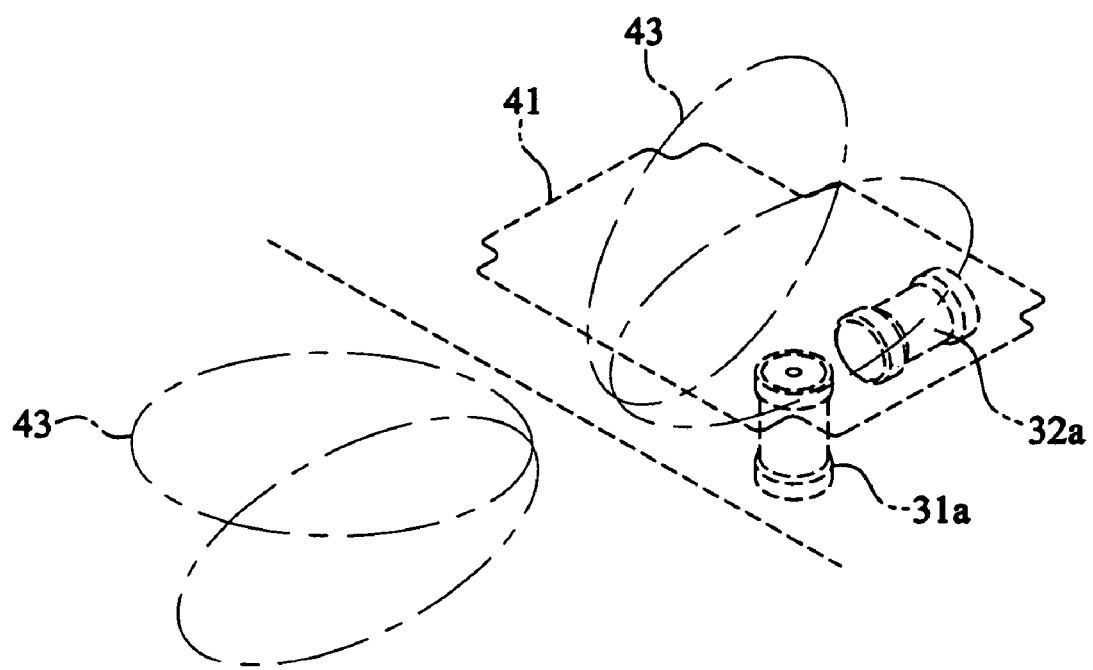

As shown in FIG. 11B, when the pet A approaches to the fence wire 10 in the parallel direction, as the electromagnetic waves 43 go through the lateral side of the first sensor 31a, quantity of electromagnetic waves 43 sensed by the first sensor 31a is decreased. While, as electromagnetic waves 43 go through the bottom and the top of the second sensor 32a, the quantity of electromagnetic waves 43 sensed by the second sensor 32a is increased.

Accordingly, as electromagnetic waves 43 go through the side of a cylindrical coil sensor depending on the direction in which the pet putting on a receiver approaches to a fence wire, the conventional coil sensor has the problem in that it does not sense a radio signal radiated from a fence wire. The present invention solves the problem by using two coil sensors which are set at a right angle each other.

The data signal detected by the first sensor unit 31 or the second sensor unit 32 is inputted to the receiver controller 39, which can read the mode data and the shock level data included in the data signal. The receiver controller 39 controls the vibration generator 36, a sound signal generator 37, and the shock generator 38 to generate only an electrical shock; a combination of electrical shock after a vibration; or a combination of electrical shock after vibration and accompanied by sound depending on the mode and shock level.

The vibration generator 36 comprises a vibration motor driver 36a to generate a vibration signal under the command of the receiver controller 39, and a vibration motor M to generate a vibration according to the vibration signal.

If the pet A wearing the receiver 30 approaches a boundary of the confined area 11, the receiver 30 receives a radio signal radiated from the fence wire 10, and the receiver controller 39 sends the drive control signal to the vibration motor driver 36a to generate a vibration signal according to the data included in the radio signal. Finally, the vibration signal is applied to the vibration motor M to generate a vibration.

The vibration motor M can generate the vibration that is provided by the rotation of a counterweight attached to a shaft. The shaft is rotated by a magnetic field which is formed via a current flowing through a coil and an electromagnetic force that is generated by the interaction of the magnetic field formed by the magnetic.

The vibration is transferred to the case of the receiver 30, and gives a vibration to the pet A wearing the receiver. Thus, a warning signal can be given to the pet A, without using sound or vision. Further, a sound produced at the sound generator 37 as well as a vibration produced at the vibration motor M can be used as a warning signal.

The sound generator 37 comprises a sound signal generator 37a for generating a sound signal under the command of the receiver controller 39, and also a speaker SPK to convert the sound signal to a sound.

The sound signal generator 37a can be composed of a sound integrated circuit (IC) in which sound data like "stop" etc. is stored. If a pet A approaches the fence wire 10 installed near the boundary of the confined area 11, the sound IC is triggered to generate a sound signal like "stop" etc. The sound signal is converted to a sound at the speaker SPK and can give a warning to the pet A.

Figure 12:
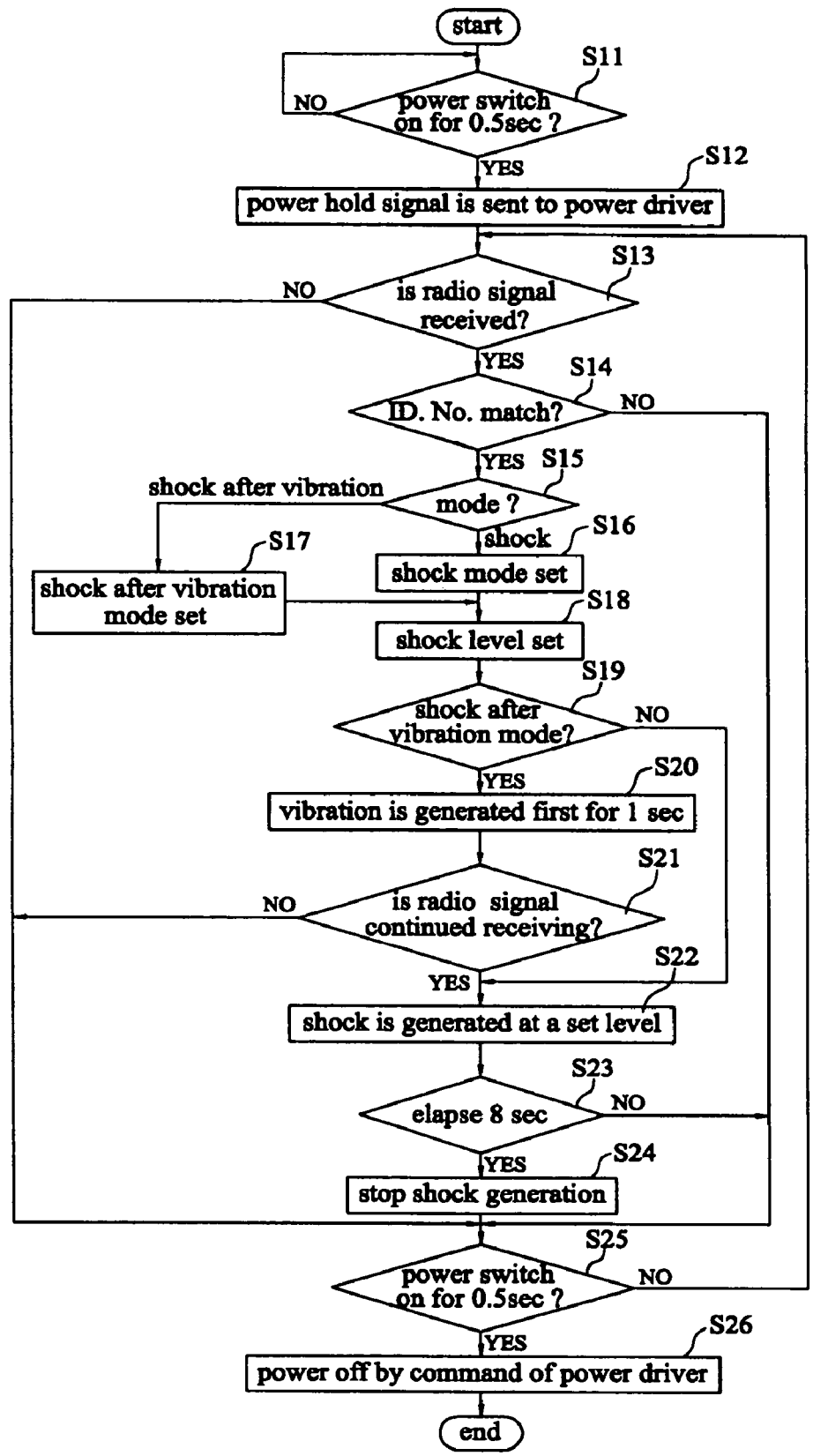

FIG. 12 is a flow chart illustrating a method to control the receiver of an electronic fence system according to the present invention.

If the user pushes the power switch 34, it makes a decision whether the power switch has an ON status for 0.5 second (step S11). If at step S11 the ON status is detected, a power hold signal is sent to the power driver 39a, and the voltage regulator 33a is operated which continually applies an electric resource to the power supplier 33 (step S12).

It is determined whether or not the radio signal is received through the first sensor unit and the second sensor unit 31, 32 (step S13), and if the radio signal is not received, the controller proceeds to step S25. If the radio signal is received, the identification number, mode and shock level data included in the radio signal are inputted. The unit determines whether the identification number has a correspondence (step S14).

If the identification number has not a correspondence, the controller proceeds to step S25. If the identification number has a correspondence, the mode data included in the received signal is received and it determines whether the mode is "shock only" or "a shock after vibration (or vibration with accompanying sound)" (step S15). In the case of "a solely shock mode", a flag bit is set as "a solely shock mode" (step S16), and in the case of "a shock after vibration (or vibration with accompanying sound)", a flag bit is set as "a shock after vibration (or vibration with accompanying sound)" (step S17).

Sequentially, the shock level data included in the received radio signal is read and the shock level is set at a flag bit (step S18). At step S19, the controller determines whether the mode is "a shock after vibration (or vibration accompanied by sound)". If it is, after a vibration (or vibration accompanied by sound) is generated first for 1 second (step S20), the controller determines whether or not the radio signal is continuously received (step S21). If it is not, the controller goes to step S25 and does not apply a shock to the pet A, if it is continuously received, the shock is generated at a set level (step S22).

At step S19, if it is not "a shock after vibration (or vibration accompanied by sound)", the controller goes to step S22, and the shock is generated at a set level. It determines whether the generation of a shock elapses for 8 seconds, and then makes a decision (step S23).

At this point, since a warning vibration is applied to the pet A, the pet A recognizes, due to being trained, through training that it has entered an Off-limits area (e.g., less than 10 m from the fence wire 10).

If the pet A moves, due to being trained, to a safe area from the fence wire 10, no radio signal is received and no shock is applied to a pet A during a repetition of a radio signal receive determining step S13 and a confirmation step S14 for an identification number.

However, if a pet A does not move away from the fence wire 10, a shock is continued for a period of 8 seconds and a pet A can be badly damaged with a great shock. Thus, the shock generator 38 is controlled to terminate a shock generation (step S24).

At the next step S25, it determines whether the status of the power switch 34 is ON. It has been pushed for 0.5 second. If it is not, it returns to step S13 to execute the following steps. If it is, it is determined as power off status, and power is turned off by the command of the controller and the execution of the program is terminated (step S26).

If a pet A, also in the embodiment of the electronic fence system, moves out of the confined area 11, an electric shock is not directly applied, but after a vibration (or vibration accompanied by sound) is applied to the pet A, it determines that a pet A is staying out of the confined area 11, and only if it is continuously out of the area, a shock is repeatedly applied.

With training, a pet A recognizes that it is out of the confined area and moves into the confined area 11. No shock to the pet A is applied. This prevents the pet A from being damaged by great electric shock.

According to the present invention, as a pet tries to move out of the confined area, a vibration or a vibration accompanying sound is first applied to the pet, and then only if the pet recognizing the vibration or a vibration accompanying sound continuously tries to move out of the confined area, an electric shock is applied to the pet.

Thus, even if the pet has a hearing loss, or the circumference is noisy, a warning signal saying, "don't go out of the fence" can be given through a touch to the skin of the pet. Further, since after a vibration is applied first, only if the pet continuously tries to move out of the confined area, the shock follows it, no severe shock need be applied to the pet that will return into the confined area after having received a vibration.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The foregoing discussion of the invention has been presented for purposes of illustration and description. The foregoing is not intended to limit the invention to the form or forms disclosed herein. In the foregoing DESCRIPTION OF THE PREFERRED EMBODIMENTS for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this DESCRIPTION OF THE PREFERRED EMBODIMENTS, with each claim standing on its own as a separate preferred embodiment of the invention.

What is claimed is:

1. An electronic fence system, comprising:
    a fence wire buried in a yard along a boundary of a confined area within which a pet may move about freely, wherein the fence wire radiates a radio signal for defining a boundary;
    a transmitter electrically connected to the fence wire and transmitting a boundary radio signal to the fence wire for defining the boundary, the boundary radio signal including a mode selection signal for selecting a direct shock mode or a combination shock mode, wherein the transmitter comprises:
        a mode selector for selecting the mode selection signal, the combination shock mode further selectively comprising:
            a combination of electrical shock and vibration; or
            a combination of electrical shock and vibration as well as sound to the pet;
        a shock level selector for selecting a level of shock applied to the pet; and
        a transmitter controller for transmitting the boundary radio signal in response to data inputted from the shock level selector and from the mode selector; and
    a receiver attached to and in communication with the pet, wherein the receiver receives the boundary defining signal with respect to an approach to the fence wire by the pet, wherein the receiver comprises:
        a first and a second sensor unit for transforming the boundary radio signal radiated from the fence wire into binary data;
        a power supplier including a voltage regulator, a recharge battery, and a charger;
        a power switch for applying power to the power supplier when/after the user pushes the power switch;
        a low voltage display for sensing a voltage of the recharge battery and for displaying its low voltage status;
        a vibration generator for applying a vibration to the pet according to the command of a receiver controller;
        the receiver controller for receiving the boundary radio signal sent from the transmitter through the first and second sensor unit, and controlling the power supplier, the power switch, the low voltage display and the vibration generator such that, depending on:
            if the combination shock mode is selected in the radio boundary signal, then after producing vibration or vibration with sound:
                if the signal is not continuously received, does not produce an electrical shock subsequently;
                if it is continuously received, produces an electrical shock subsequently;
            if receiving in the direct shock mode, applies an electrical shock to the pet;
        a sound signal generator for generating a sound according to the boundary radio signal of the receiver controller;
        a shock generator for giving the electrical shock to the pet according to the boundary radio signal of the receiver controller; and
        a power actuator for continually applying power to the power supplier according to a power hold signal received from the receiver controller.

2. The electronic fence system of claim 1, wherein the first sensor unit and the second sensor unit comprise a first and a second cylindrical coil sensor, a first and a second filter, a first and a second amplifier, and a first and a second waveform generator, respectively.

3. The electronic fence system of claim 2, wherein one of the first and the second cylindrical coil sensor is uprightly mounted on a part side of a printed circuit board in a proximity of an edge, and a second of the first and the second cylindrical coils is horizontally mounted in a lay down posture.

4. A method for controlling the receiver of an electronic fence for a pet, the method comprising:
    (a) determining whether a power switch has an ON status for a predetermined time, and if the ON status is detected for the predetermined time, driving a power supplier;
    (b) determining whether or not a radio signal is received through a first sensor unit and a second sensor unit, and if the radio signal is not received, proceeding to step (e), or if it is received, reading both a mode and a shock level data included in the radio signal;
    (c) determining whether the mode is "shock only" or "a shock after vibration (or vibration with accompanying sound)", and if it is "a shock after vibration (or vibration with accompanying sound)", after a vibration (or vibration accompanied by sound) is generated first for about 1 second, determining whether or not the radio signal is continuously received, and sequentially, if it is not continuously received, proceeding to step (e) and not applying a shock to the pet, if it is continuously received, the shock is generated at a set level;
    (d) producing only a shock at the predetermined level during the predetermined time if the mode determining result of the step (c) is "shock only", and if the shock keeps on being produced during more than the predetermined time, stopping the shock; and (e) determining whether the power switch has an ON status for a predetermined time, and if the ON status is not detected for the predetermined time, returning to the step (b), or if the ON status is detected during the predetermined time, turning the power off and terminating the execution of a program.

5. The method as set forth in claim 4, wherein the predetermined continuation time during which the power switch has ON status for driving the power supplier and turning the power off is about 0.5 seconds.

6. The method as set forth in claim 4, wherein the predetermined continuation time during which the shock keeps on being produced for stopping the shock is about 8 seconds.

* * * * *